(12) United States Patent
Sun et al.

(10) Patent No.: US 10,132,966 B2
(45) Date of Patent: Nov. 20, 2018

(54) OPTICAL ELEMENT INCLUDING STRIP-SHAPED PRISMS, LIGHT GUIDE PLATE, PRISM, BACKLIGHT MODULE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Wenjia Sun, Beijing (CN); Kai Diao, Beijing (CN); Inho Park, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/509,718

(22) PCT Filed: Jan. 27, 2016

(86) PCT No.: PCT/CN2016/072264
§ 371 (c)(1),
(2) Date: Mar. 8, 2017

(87) PCT Pub. No.: WO2017/054382
PCT Pub. Date: Apr. 6, 2017

(65) Prior Publication Data
US 2017/0293055 A1    Oct. 12, 2017

(30) Foreign Application Priority Data

Sep. 28, 2015    (CN) .......................... 2015 1 0628980

(51) Int. Cl.
*G02B 5/04* (2006.01)
*F21V 8/00* (2006.01)
(Continued)

(52) U.S. Cl.
CPC ............. *G02B 5/04* (2013.01); *G02B 5/0231* (2013.01); *G02B 5/0242* (2013.01); *G02B 6/00* (2013.01); *G02B 6/004* (2013.01); *G02B 6/0053* (2013.01)

(58) Field of Classification Search
CPC ......... G02B 5/04; G02B 6/0053; G02B 6/004
See application file for complete search history.

(56) References Cited

U.S. PATENT DOCUMENTS 8,506,149 B2    8/2013 Kim et al.
2006/0268438 A1    11/2006 Lee et al.
(Continued)

FOREIGN PATENT DOCUMENTS

CN    101051149 A    10/2007
CN    101178513 A    5/2008
(Continued)

OTHER PUBLICATIONS

ISR and Written Opinion dated Jul. 1, 2016: PCT/CN2016/072264.
The First Chinese Office Action dated Feb. 17, 2017; Appln. No. 201510628980.4.

*Primary Examiner* — Joseph L Williams
(74) *Attorney, Agent, or Firm* — Ladas & Parry LLP; Loren K. Thompson

(57) ABSTRACT

An optical element includes a light transmitting substrate which includes a first surface having strip-shaped prisms arranged parallel to each other. In a direction along which the prisms are arranged, a side of each prism close to a center of the light transmitting substrate has a refractive surface; from an end of the refracting surface close to a center of the light transmitting substrate to another end of the refracting surface close to an edge of the light transmitting substrate, the refracting surface inclines gradually along a direction away from the first surface. From the prism nearest to the center of the light transmitting substrate to the prism farthest (Continued)

to the center of the light transmitting substrate, an angle between the refracting surface and a normal of the first surface is gradually increased. A light guide plate, a prism, a backlight module and a display device are further provided.

17 Claims, 2 Drawing Sheets

(51) Int. Cl.
*G02B 6/00* (2006.01)
*G02B 5/02* (2006.01)

(56) References Cited

U.S. PATENT DOCUMENTS

| | | | |
|---|---|---|---|
| 2008/0112185 A1 | 5/2008 | Noh et al. | |
| 2013/0279192 A1 | 10/2013 | Chang et al. | |

FOREIGN PATENT DOCUMENTS

| | | | |
|---|---|---|---|
| CN | 101300451 A | 11/2008 | |
| CN | 100652511 C | 10/2009 | |
| CN | 201606821 U | 10/2010 | |
| CN | 102176080 A | 9/2011 | |
| CN | 102661572 A | 9/2012 | |
| CN | 102859272 A | 1/2013 | |
| CN | 105116477 A | 12/2015 | |
| CN | 204945419 U | 1/2016 | |
| KR | 10138501 B1 | 4/2014 | |
| TW | 200641406 A | 12/2006 | |

OPTICAL ELEMENT INCLUDING STRIP-SHAPED PRISMS, LIGHT GUIDE PLATE, PRISM, BACKLIGHT MODULE AND DISPLAY DEVICE

CROSS REFERENCE OF RELATED APPLICATIONS

The present application claims the priority of the Chinese Patent Application No. 201510628980.4 filed on Sep. 28, 2015, the entirety of which is incorporated herein by reference.

TECHNICAL FIELD

Embodiments of the present disclosure relate to the technical field of display, and especially relate to an optical element, a light guide plate, a prism, a backlight module and a display device.

BACKGROUND

With the development of and the new demand of consumers for liquid crystal displays, a display with high brightness and low power consumption becomes a main trend of development inevitably. The high brightness of the display for example is achieved by attaching a polarizer on a display panel or adding a special brightening film in the Back Light Unit (BLU). However, with the improvement of the brightness, the cost is also significantly improved. In addition, the high brightness of the display for example is achieved by a prism Light Guide Plate (LGP) cooperating with an inverse prism. An upper surface of the LGP is made into the prism, a dot design is provided on a lower surface of the LGP, and the inverse prism is further provided, so that the brightness of the display is improved. However, the problems of low view angle and low yield are caused.

SUMMARY

The present disclosure provides an optical element, a light guide plate, a prism, a backlight module and a display device, which can improve the view angle while improving the brightness, and solve the problem that the light guide plate has a small view angle and a low yield.

The technical solutions of the present disclosure are as follows:

An optical element comprises: a light transmitting substrate. The light transmitting substrate comprises a first surface, and the first surface is provided with a plurality of strip-shaped prisms which are arranged parallel to each other along a predetermined direction and extend along another predetermined direction; in the first direction along which the plurality of strip-shaped prisms are arranged, a side of each strip-shaped prism close to a center of the light transmitting substrate has a refractive surface; from an end of the refracting surface close to the center of the light transmitting substrate to another end of the refracting surface close to an edge of the light transmitting substrate, the refracting surface inclines gradually along a direction away from the first surface; and from the strip-shaped prism nearest to the center of the light transmitting substrate to the strip-shaped prism farthest to the center of the light transmitting substrate, an angle between the refracting surface and a normal of the first surface is gradually increased.

For example, a cross section of each strip-shaped prism is triangular, and the cross section of each strip-shaped prism is parallel to the first direction along which the plurality of strip-shaped prisms are arranged and is perpendicular to the first surface; and the triangular cross section of each strip-shaped prism comprises a first vertex, a first side and a second side respectively connected between the first vertex and the first surface, the first side is located on a side of the triangular cross section of the strip-shaped prism close to the center of the light transmitting substrate, and the refracting surface of the strip-shaped prism is formed by the first side.

For example, an angle between the first direction along which the plurality of strip-shaped prisms are arranged and the second direction along which the strip-shaped prisms extend is $90°\pm1°$.

For example, in the first direction along which the plurality of strip-shaped prisms are arranged, the plurality of strip-shaped prisms are symmetrical with respect to the center of the light transmitting substrate.

For example, the plurality of strip-shaped prisms comprise: a central prism located in the center of the light transmitting substrate in the first direction along which the plurality of strip-shaped prisms arranged, and the central prism comprises two refractive surfaces which are symmetrical with respect to the center of the light transmitting substrate; and two lateral prism groups respectively arranged on two sides of the central prism; and the angle between the refractive surface of the central prism and the normal of the first surface is less than the angle between the refractive surface of each strip-shaped prism of each lateral prism group and the normal of the first surface.

A light guide plate comprises the optical element as described above, and the first surface is a light emitting surface of the light guide plate.

For example, the light transmitting substrate further comprises a second surface opposite to the first surface and the second surface is provided with a plurality of scattering patterns.

For example, each scattering pattern has a fan-shaped structure.

A prism comprises the optical element as described above.

For example, diffusion particles are arranged in the light transmitting substrate.

A backlight module comprises the light guide plate as described above.

For example, the backlight module according to claim further comprises the above-described prism arranged on a side of the light-emitting surface of the light guide plate, the first surface of the prism is arranged to face the first surface of the light guide plate, and a preset angle is formed between the extension direction along which the strip-shaped prisms of the prism extend and the extension direction along which the strip-shaped prisms of the light guide plate extend.

For example, the preset angle between the extension direction along which the strip-shaped prisms of the prism extend and the second extension direction along which the strip-shaped prisms of the light guide plate extend is 90°.

For example, the first surface of the prism and the first surface of the light guide plate are connected by an optically clear adhesive.

A display device comprises the backlight module as described above.

The beneficial effects of the present disclosure are as follows:

The optical element provided by the present disclosure can be used as the light guide plate in the backlight module to improve the light propagation angle of the backlight module and to enhance the view angle of the display device, thus the problem that the view angle is small and the yield is low is solved.

BRIEF DESCRIPTION OF THE DRAWINGS

In order to provide a clearer description of the technical solutions of the embodiments of the disclosure or the relative technology, the drawings of the embodiments or the relative technology will be briefly described in the following; it is apparent that the drawings in the following description are merely related to some embodiments of the disclosure, and for those skilled in the art, other drawings may be obtained according to those described drawings without departing from the inventive nature of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
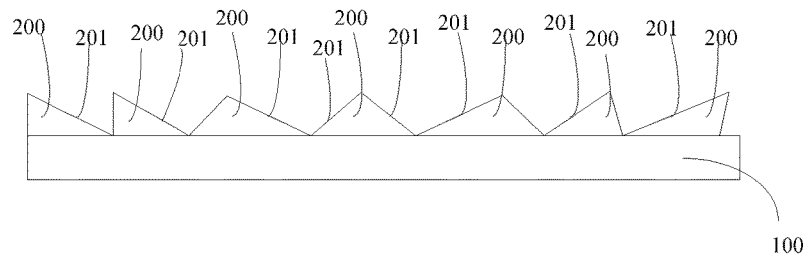
FIG. 1 is a structure schematic view of an optical element provided in some embodiments of the present disclosure.

As shown in FIG. 1, an optical element is provided in some embodiments of the present disclosure, and the optical element includes a light transmitting substrate 100, the light transmitting substrate 100 includes a first surface, and the first surface is provided with a plurality of strip-shaped prisms 200 which are arranged parallel to each other along a predetermined direction (for example, a first direction) and extend along another predetermined direction (for example, a second direction); in the direction along which the plurality of strip-shaped prisms 200 arranged, a side of each strip-shaped prism 200 close to a center of the light transmitting substrate 100 has a refractive surface 201; from an end of the refracting surface 201 close to the center of the light transmitting substrate 100 to another end of the refracting surface 201 close to an edge of the light transmitting substrate 100, the refracting surface 201 inclines gradually along a direction away from the first surface; and from the strip-shaped prism 200 nearest to the center of the light transmitting substrate 100 to the strip-shaped prism 200 farthest to the center of the light transmitting substrate 100, an angle between the refracting surface 201 and a normal of the first surface is gradually increased.

In the above embodiments, a prism structure comprising the plurality of strip-shaped prisms 200 is arranged on the upper surface of the light transmitting substrate 100 of the optical element, and the plurality of strip-shaped prisms 200 are provided as follows: the plurality of strip-shaped prisms 200 are arranged on left and right sides of an axis which is the center of the light transmitting substrate 100, and the closer to the edge of the transparent substrate 100, the greater the inclination of the strip-shaped prisms 200. The above design ensures that the light emitted from the prism structure arranged on the surface of the light transmitting substrate 100 emits upward and is not completely perpendicular to the surface of the light transmitting substrate 100, and the light propagation angle of the optical element is increased. In the case that the optical element is used in a backlight module as a light guide plate, the view angle of the backlight module is increased, thus the problem of small view angle in the case that the prism structure is arranged on the surface of the guide plate in the related technology is solved.

In the optical element provided in some embodiments of the present disclosure, for example, as shown in FIG. 1, a cross section of each strip-shaped prism 200 is triangular, and the cross section of each strip-shaped prism is parallel to the direction along which the plurality of strip-shaped prisms 200 are arranged and is perpendicular to the first surface; the triangular cross section of each strip-shaped prism 200 includes a first vertex; a first side and a second side respectively connected between the first vertex and the first surface; the first side is located on a side of the triangular cross section of the strip-shaped prism 200 close to the center of the light transmitting substrate 100, and the refracting surface 201 of the strip-shaped prism 200 is formed by the first side.

In the above embodiments, the cross section of each strip-shaped prism 200 is triangular; however, it should be understood that, in practical applications, the structure of the strip-shaped prism 200 is the strip-shaped prism with the cross section of various shapes, such as a trapezoid shape, etc., as long as it is ensured that from the center to the edge of the light transmitting substrate 100, the inclination angle of the refraction surface 201 of the strip-shaped prism 200 is increased gradually.

Furthermore, in the optical element provided in some embodiments of the present disclosure, for example, an angle between the direction along which the plurality of strip-shaped prisms 200 are arranged and the direction along which the strip-shaped prisms 200 extend is 90°±1°. That is to say, for example, the angle of the prism structure comprising the plurality of strip-shaped prisms 200 on the light transmitting substrate 100 is 90°±1°. It should be understood that 90°±1° is provided in this present disclosure as an example and is not limitative of the disclosure.

Furthermore, as shown in FIG. 1, for example, in the direction along which the plurality of strip-shaped prisms 200 are arranged, the plurality of strip-shaped prisms 200 are symmetrical with respect to the center of the light transmitting substrate 100. The plurality of prisms distributed on the light transmitting substrate 100 symmetrically is favorable for the light to diffuse uniformly.

The optional structures of the plurality of strip-shaped prisms 200 of the optical element provided in the present disclosure are as follows.

As shown in FIG. 1, the plurality of strip-shaped prisms 200 include: a central prism located in the center of the light transmitting substrate in the direction along which the plurality of strip-shaped prisms 200 are arranged, and the central prism including two refractive surfaces 201 which are symmetrical with respect to the center of the light transmitting substrate 100; and two lateral prism groups arranged on two sides of the central prism respectively; the angle between each refractive surface 201 of the central prism and the normal of the first surface is less than the angle between the refractive surface 201 of each strip-shaped prism 200 of each lateral prism group and the normal of the first surface.

In the above embodiments, in the plurality of strip-shaped prisms 200, the central prism is symmetrical with respect to the center of the light transmitting substrate 100, and the strip-shaped prisms 200 respectively arranged on two sides of the central prism are symmetrical with respect to the center of the light transmitting substrate 100, so as to achieve a complete symmetry. It should be understood that, in practical applications, the structure of the plurality of strip-shaped prisms 200 is not limited to the above-described structure, and the plurality of strip-shaped prisms 200 may have other structures.

It is to be noted that, the optical element provided in some embodiments of the present disclosure for example is used as a light guide plate, a prism, or other optical elements that propagate light.

A light guide plate is also provided in some embodiments of the present disclosure, and the light guide plate is made of the above-mentioned optical element. That is to say, the structure of the light guide plate is the same as the structure of the optical element.

Figure 2:
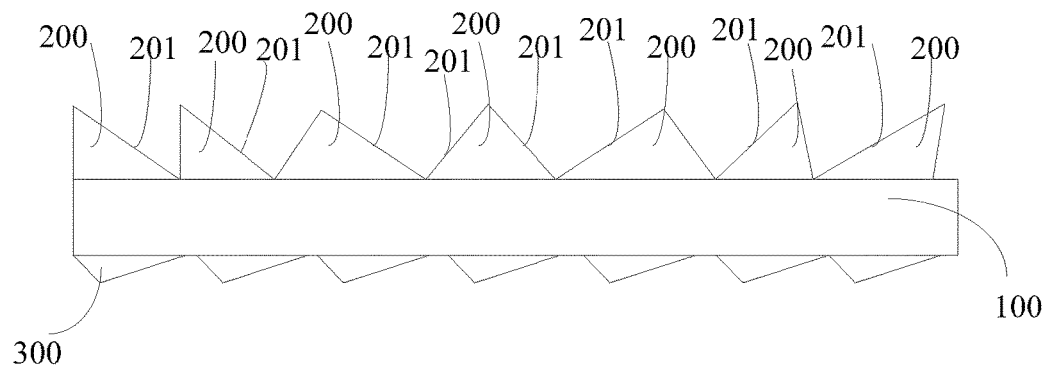
FIG. 2 is a structure schematic view of a light guide plate provided in some embodiments of the present disclosure.

Specifically, FIG. 2 is a structure schematic view of the light guide plate provided in some embodiments of the present disclosure.

As shown in FIG. 2, the light guide plate 10 includes a light transmitting substrate 100, the light transmitting substrate 100 includes a first surface, and the first surface is provided with a plurality of strip-shaped prisms 200 which are arranged parallel to each other along a predetermined direction (for example, a first direction) and extend along another predetermined direction (for example, a second direction); in the direction along which the plurality of strip-shaped prisms 200 are arranged, a side of each strip-shaped prism 200 close a center of the light transmitting substrate 100 has a refractive surface 201; from an end of the refracting surface 201 close to the center of the light transmitting substrate 100 to another end of the refracting surface 201 close to an edge of the light transmitting substrate 100, the refracting surface 201 inclines gradually along a direction away from the first surface; and from the strip-shaped prism 200 nearest to the center of the light transmitting substrate 100 to the strip-shaped prism 200 farthest to the center of the light transmitting substrate 100, an angle between the refracting surface 201 and a normal of the first surface is gradually increased.

In the case that the light guide plate 10 provided in some embodiments of the present disclosure is used in a backlight module, it is ensured that the light emitted from the prism structure arranged on the surface of the light transmitting substrate 100 emits upward and is not completely perpendicular to the surface of the light transmitting substrate 100, and the view angle of the backlight module is increased, thus the problem of small view angle in the case that the prism structure is arranged on the surface of the guide plate in the related technology is solved.

It is to be noted that, in the above embodiments, for the purpose of clearly describing the structure of the strip-shaped prisms 200, the arrangement direction and the extension direction for example are extension directions of two adjacent edges of the light transmitting substrate 100 of the light guide plate 10; however, the arrangement direction and the extension direction are not limited thereto.

In the light guide plate provided in some embodiments of the present disclosure, for example, as shown in FIG. 2, a cross section of each strip-shaped prism 200 is triangular, and the cross section of each strip-shaped prism is parallel to the direction along which the plurality of strip-shaped prisms 200 are arranged and is perpendicular to the first surface; the triangular cross section of each strip-shaped prism 200 includes a first vertex; a first side and a second side respectively connected between the first vertex and the first surface; the first side is located on a side of the triangular cross section of the strip-shaped prism 200 close to the center of the light transmitting substrate 100, and the refracting surface 201 of the strip-shaped prism 200 is formed by the first side.

In the above embodiments, the cross section of each strip-shaped prism 200 is triangular; however, it should be understood that, in practical applications, the structure of the strip-shaped prism 200 is the strip-shaped prism with the cross section of various shapes, such as a trapezoid shape, etc., as long as it is ensured that from the center to the edge of the light transmitting substrate 100, the inclination angle of the refraction surface 201 of the strip-shaped prism 200 is increased gradually Furthermore, in the light guide plate 10 provided in some embodiments of the present disclosure, for example, an angle between the direction along which the plurality of strip-shaped prisms 200 are arranged and the direction along which the strip-shaped prisms 200 extend is 90°±1°. That is to say, for example, the angle of the prism structure comprising the plurality of strip-shaped prisms 200 on the light transmitting substrate 100 is 90°±1°. It should be understood that 90°±1° is provided in this present disclosure as an example and is not limitative of the disclosure.

Furthermore, as shown in FIG. 2, for example, in the direction along which the plurality of strip-shaped prisms 200 are arranged, the plurality of strip-shaped prisms 200 are symmetrical with respect to the center of the light transmitting substrate 100. The plurality of prisms distributed on the light transmitting substrate 100 symmetrically is favorable for the light to diffuse uniformly.

The optional structures of the plurality of strip-shaped prisms 200 of the light guide plate provided in the present disclosure are as follows.

As shown in FIG. 2, the plurality of strip-shaped prisms include: a central prism located in the center of the light transmitting substrate in the direction along which the plurality of strip-shaped prisms 200 are arranged, and the central prism including two refractive surfaces 201 which are symmetrical with respect to the center of the light transmitting substrate 100; and two lateral prism groups arranged on two sides of the central prism respectively; the angle between each refractive surface 201 of the central prism and the normal of the first surface is less than the angle between the refractive surface 201 of each strip-shaped prism 200 of each lateral prism group and the normal of the first surface.

In the above embodiments, in the plurality of strip-shaped prisms 200, the central prism is symmetrical with respect to the center of the light transmitting substrate 100, and the strip-shaped prisms 200 respectively arranged on two sides of the central prism are symmetrical with respect to the center of the light transmitting substrate 100, so as to achieve a complete symmetry. It should be understood that, in practical applications, the structure of the plurality of strip-shaped prisms 200 is not limited to the above-described structure, and the plurality of strip-shaped prisms 200 may have other structures.

Furthermore, the light guide plate 10 provided in some embodiments of the present disclosure further includes a second surface opposite to the first surface, the first surface is a light emitting surface, and a plurality of scattering patterns 300 are arranged on the second surface. The scattering patterns 300 for example are configured into a fan shape or other irregular shapes; and the scattering patterns coordinate with the angle of the prism on the light emitting surface of the light guide plate 10 to achieve a best emitting effect.

Furthermore, a prism is also provided in some embodiments of the present disclosure, and the prism is made of the above-mentioned optical element. That is to say, the structure of the prism is the same as the structure of the optical element.

Figure 3:
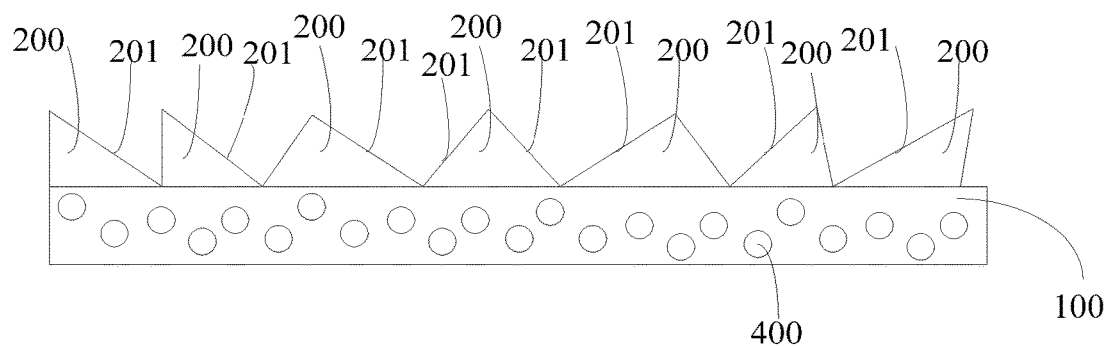
FIG. 3 is a structure schematic view of a prism provided in some embodiments of the present disclosure.

FIG. 3 is a structure schematic view of the prism provided in some embodiments of the present disclosure.

As shown in FIG. 3, the prism provided in some embodiments of the present disclosure includes a light transmitting substrate 100, the light transmitting substrate 100 includes a first surface, and the first surface is provided with a plurality of strip-shaped prisms 200 which are arranged parallel to each other along a predetermined direction and extend along another predetermined direction; in the direction along which the plurality of strip-shaped prisms 200 are arranged, a side of each strip-shaped prism 200 close to a center of the light transmitting substrate 100 has a refractive surface 201; from an end of the refracting surface 201 close to the center of the light transmitting substrate 100 to another end of the refracting surface 201 close to the edge of the light transmitting substrate 100, the refracting surface 201 inclines gradually along a direction away from the first surface; and from the strip-shaped prism 200 nearest to the center of the light transmitting substrate 100 to the strip-shaped prism 200 farthest to the center of the light transmitting substrate 100, an angle between the refracting surface 201 and a normal of the first surface is gradually increased.

In the above embodiments, a prism structure comprising the plurality of strip-shaped prisms 200 is arranged on the upper surface of the light transmitting substrate 100 of the prism, and the plurality of strip-shaped prisms 200 are designed as follows: the plurality of strip-shaped prisms 200 are arranged on left and right sides of an axis which is the center of the light transmitting substrate 100, and the closer to the edge of the transparent substrate 100, the greater the inclination of the strip-shaped prisms 200. The above design ensures that the light emitted from the prism structure arranged on the surface of the light transmitting substrate 100 emits upward and is not completely perpendicular to the surface of the light transmitting substrate 100, and the light propagation angle of the optical element is increased.

In the prism provided in some embodiments of the present disclosure, for example, as shown in FIG. 3, a cross section of each strip-shaped prism 200 is triangular, and the cross section of each strip-shaped prism is parallel to the direction along which the plurality of strip-shaped prisms 200 are arranged and is perpendicular to the first surface; the triangular cross section of each strip-shaped prism 200 includes a first vertex; a first side and a second side respectively connected between the first vertex and the first surface; the first side is located on a side of the triangular cross section of the strip-shaped prism 200 close to the center of the light transmitting substrate 100, and the refracting surface 201 of the strip-shaped prism 200 is formed by the first side.

In the above embodiments, the cross section of each strip-shaped prism 200 is triangular; however, it should be understood that, in practical applications, the structure of the strip-shaped prism 200 is the strip-shaped prism with the cross section of various shapes, such as a trapezoid shape, etc., as long as it is ensured that from the center to the edge of the light transmitting substrate 100, the inclination angle of the refraction surface 201 of the strip-shaped prism 200 is increased gradually.

Furthermore, in the prism provided in some embodiments of the present disclosure, for example, an angle between the direction along which the plurality of strip-shaped prisms 200 are arranged and the direction along which the strip-shaped prisms 200 extend is 90°±1°. That is to say, for example, the angle of the prism structure comprising the plurality of strip-shaped prisms 200 on the light transmitting substrate 100 is 90°±1°. It should be understood that 90°±1° is provided in this present disclosure as an example and is not limitative of the disclosure.

Furthermore, as shown in FIG. 3, for example, in the direction along which the plurality of strip-shaped prisms 200 are arranged, the plurality of strip-shaped prisms 200 are symmetrical with respect to the center of the light transmitting substrate 100. The plurality of prisms distributed on the light transmitting substrate 100 symmetrically is favorable for the light to diffuse uniformly.

The optional structures of the plurality of strip-shaped prisms 200 of the prism provided in the present disclosure are as follows.

As shown in FIG. 3, the plurality of strip-shaped prisms 200 include: a central prism located in the center of the light transmitting substrate in the direction along which the plurality of strip-shaped prisms 200 are arranged, and the central prism including two refractive surfaces 201 which are symmetrical with respect to the center of the light transmitting substrate 100; and two lateral prism groups respectively arranged on two sides of the central prism; the angle between the refractive surface 201 of the central prism and the normal of the first surface is less than the angle between the refractive surface 201 of each strip-shaped prism 200 of each lateral prism group and the normal of the first surface.

In the above embodiments, in the plurality of strip-shaped prisms 200, the central prism is symmetrical with respect to the center of the light transmitting substrate 100, and the strip-shaped prisms 200 respectively arranged on two sides of the central prism are symmetrical with respect to the center of the light transmitting substrate 100, so as to achieve a complete symmetry. It should be understood that, in practical applications, the structure of the plurality of strip-shaped prisms 200 is not limited to the above-described structure, and the plurality of strip-shaped prisms 200 may have other structures.

In the prism provided in some embodiments of the present disclosure, for example, as shown in FIG. 3, diffusion particles 400 are disposed in the light transmitting substrate 100 of the prism. The diffusion uniformity is further improved by providing the diffusion particles 400.

Figure 4:
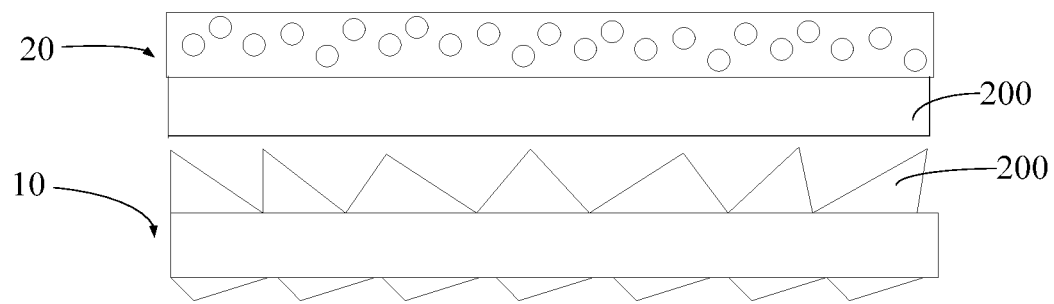
FIG. 4 is a structure schematic view of a backlight module provided in some embodiments of the present disclosure.

As shown in FIG. 4, a backlight module is provided in some embodiments of the present disclosure, and the backlight module includes the light guide plate 10 provided in some embodiments of the present disclosure.

In the above embodiments, the backlight module includes the light guide plate 10 having the prism structure. The plurality of strip-shaped prisms 200 are provided on the light emitting surface of the light guide plate 10 and are arranged on the left and right sides of the axis which is the center of the light guide plate 10, and the closer to the edge of the light guide plate 10, the greater the inclination of the strip-shaped prisms 200. Thus, the propagation angle of light emitted from the prism structure arranged on the light emitting surface of the light guide plate 10 is increased, and the problem of small view angle in the case that the prism structure is arranged on the surface of the guide plate in the related technology is solved.

In the backlight module provided in some embodiments of the present disclosure, for example, as shown in FIG. 4, the backlight module further includes the prism 20 arranged on a side of the light-emitting surface of the light guide plate 10, the prism 20 is the prism 20 provided in some embodiments of the present disclosure, and the first surface of the prism 20 is arranged to face the first surface of the light guide plate 10, so that light emitted from the first surface of the light guide plate 10 enters into the first surface of the prism 20.

In the above embodiments, the backlight module is designed by combing the light guide plate 10 with the inverse prism 20, and the plurality of strip-shaped prisms 200 of the prism 20 are arranged on the left and right sides of the axis which is the center of the prism 20, and the closer to the edge of the prism 20, the greater the inclination of the strip-shaped prisms 200. Thus, the view angle of the backlight module is increased, and the defective rate is reduced.

In the backlight module provided in some embodiments of the present disclosure, for example, as shown in FIG. 4, a preset angle is formed between the extension direction of the strip-shaped prisms 200 of the prism 20 and the extension direction of the strip-shaped prisms 200 of the light guide plate 10, and further for example, the preset angle between the extension direction of the strip-shaped prisms of the prism and the extension direction of the strip-shaped prisms of the light guide plate is 90°.

That is to say, the difference between the angle of the prism structure of the inverse prism 20 coordinating with light guide plate 10 and the angle of the prism structure on the upper surface of the light guide plate 10 is 90°, thus the efficiency of light is improved better. For example, the diffusion particles 400 are added in the light transmitting substrate of the inverse prism 20, thus the distribution of the emitting light is more uniform, and the view angle is further improved. In addition, by combining the light guide plate and the inverse prism, an upper diffusion sheet is omitted, and at the same time, a same picture quality as the structure having the upper diffusion sheet in the relevant technology is obtained.

In addition, in the related technology, in the case that the backlight module adopts the combination of the light guide plate and the inverse prism, the problems of being difficult to assemble the light guide plate 10 and the inverse prism 20 and low yield are caused. In the present disclosure, the backlight module are provided in some embodiments of the present disclosure, for example, the light emitting surface of the prism 20 and the light emitting surface of the light guide plate 10 are connected by an optically clear adhesive (OCA). The light guide plate 10 and the inverse prism 20 are connected by the optically clear adhesive (COA), the friction loss is reduced, the yield is improved and the cost is reduced.

A display device is provided in some embodiments of the present disclosure, and the display device includes the backlight module provided in some embodiments of the present disclosure.

The above are the optional embodiments of the present disclosure, it should be pointed out that for those skilled in the art, on the premise that does not deviate from the principle of the present disclosure, some improvement and polishing can also be made, the improvement and polishing should also be regarded as the scope of the protection of the present disclosure.

The invention claimed is:

1. An optical element, comprising: a light transmitting substrate, wherein
   the light transmitting substrate comprises a first surface, and the first surface is provided with a plurality of strip-shaped prisms which are arranged parallel to each other along a first direction and extend along a second direction;
   in the first direction along which the plurality of strip-shaped prisms are arranged, a side of each strip-shaped prism close to a center of the light transmitting substrate has a refractive surface;
   from an end of the refracting surface close to the center of the light transmitting substrate to another end of the refracting surface close to an edge of the light transmitting substrate, the refracting surface inclines gradually along a direction away from the first surface; and
   from the strip-shaped prism nearest to the center of the light transmitting substrate to the strip-shaped prism farthest to the center of the light transmitting substrate, an angle between the refracting surface and a normal of the first surface is gradually increased.

2. The optical element according to claim 1, wherein
   a cross section of each strip-shaped prism is triangular, and the cross section of each strip-shaped prism is parallel to the first direction along which the plurality of strip-shaped prisms are arranged and is perpendicular to the first surface; and
   the triangular cross section of each strip-shaped prism comprises a first vertex, a first side and a second side respectively connected between the first vertex and the first surface, the first side is located on a side of the triangular cross section of the strip-shaped prism close to the center of the light transmitting substrate, and the refracting surface of the strip-shaped prism is formed by the first side.

3. The optical element according to claim 1, wherein an angle between the first direction along which the plurality of strip-shaped prisms are arranged and the second direction along which the strip-shaped prisms extend is 90°±1°.

4. The optical element according to claim 1, wherein in the first direction along which the plurality of strip-shaped prisms are arranged, the plurality of strip-shaped prisms are symmetrical with respect to the center of the light transmitting substrate.

5. The optical element according to claim 4, wherein
   the plurality of strip-shaped prisms comprise: a central prism located in the center of the light transmitting substrate in the first direction along which the plurality of strip-shaped prisms arranged, and the central prism comprises two refractive surfaces which are symmetrical with respect to the center of the light transmitting substrate; and two lateral prism groups respectively arranged on two sides of the central prism; and the angle between the refractive surface of the central prism and the normal of the first surface is less than the angle between the refractive surface of each strip-shaped prism of each lateral prism group and the normal of the first surface.

6. A light guide plate, comprising the optical element according to claim 1, wherein the first surface is a light emitting surface of the light guide plate.

7. The light guide plate according to claim 6, wherein the light transmitting substrate further comprises a second surface opposite to the first surface and the second surface is provided with a plurality of scattering patterns.

8. The light guide plate according to claim 7, wherein each scattering pattern has a fan-shaped structure.

9. A prism, comprising the optical element according to claim 1.

10. The prism according to claim 9, wherein diffusion particles are arranged in the light transmitting substrate.

11. A backlight module, comprising the light guide plate according to claim 6.

12. The backlight module according to claim 11, further comprising a prism arranged on a side of the light-emitting surface of the light guide plate, wherein the prism comprises an optical element comprising another light transmitting substrate, the another light transmitting substrate comprises a third surface and the third surface is provided with a plurality of strip-shaped prisms which are arranged parallel to each other along a third direction and extend along a fourth direction;

in the third direction along which the plurality of strip-shaped prisms are arranged, a side of each strip-shaped prism close to a center of the another light transmitting substrate has refractive surface;

from an end of the refracting surface close to the center of the another light transmitting substrate to another end of the refracting surface close to an edge of the another light transmitting substrate, the refracting surface inclines gradually along a direction away from the third surface; and from the strip-shaped prism nearest to the center of the another light transmitting substrate to the strip-shaped prism farthest to the center of the another light transmitting substrate, an angle between the refracting surface and a normal of the third surface is gradually increased, and wherein the third surface of the prism is arranged to face the first surface of the light guide plate, and a preset angle is formed between the fourth direction along which the strip-shaped prisms of the prism extend and the second direction along which the strip-shaped prisms of the light guide plate extend.

13. The backlight module according to claim 12, wherein the preset angle between the fourth direction along which the strip-shaped prisms of the prism extend and the second direction along which the strip-shaped prisms of the light guide plate extend is 90°.

14. The backlight module according to claim 12, wherein the third surface of the prism and the first surface of the light guide plate are connected by an optically clear adhesive.

15. A display device, comprising the backlight module according to claim 11.

16. The backlight module according to claim 11, wherein the light transmitting substrate of the light guide plate further comprises a second surface opposite to the first surface and the second surface is provided with a plurality of scattering patterns.

17. The backlight module according to claim 12, wherein diffusion particles are arranged in the another light transmitting substrate of the prism.

* * * * *